US008879541B2

(12) United States Patent
Noda et al.

(10) Patent No.: US 8,879,541 B2
(45) Date of Patent: Nov. 4, 2014

(54) IP TELEPHONE AND METHOD FOR CONTROLLING SUPPLEMENTARY SERVICES

(75) Inventors: Masahide Noda, Kawasaki (JP); Kazuki Matsui, Kawasaki (JP); Satoshi Okuyama, Kawasaki (JP); Masahiko Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 12/805,590

(22) Filed: Aug. 6, 2010

(65) Prior Publication Data

US 2010/0303062 A1    Dec. 2, 2010

Related U.S. Application Data

(63) Continuation of application No. PCT/JP2008/052187, filed on Feb. 8, 2008.

(51) Int. Cl.
*H04L 12/66* (2006.01)
*H04M 3/42* (2006.01)

(52) U.S. Cl.
USPC .................. 370/352; 379/211.01; 379/214.01

(58) Field of Classification Search
USPC ............ 370/352; 379/201.01, 211.01–214.01
See application file for complete search history.

(56) References Cited

U.S. PATENT DOCUMENTS

| 2002/0130791 | A1* | 9/2002 | Stumer ....................... 340/932.2 |
| 2004/0240656 | A1* | 12/2004 | Poustchi ................... 379/220.01 |
| 2005/0220039 | A1* | 10/2005 | Hoshino et al. .............. 370/261 |
| 2008/0186954 | A1* | 8/2008 | Kumarasamy et al. ....... 370/352 |
| 2009/0074161 | A1 | 3/2009 | Kamiya |

FOREIGN PATENT DOCUMENTS

| JP | 2003-29872 | 1/2003 |
| JP | 2003-527786 | 9/2003 |
| JP | 2004-328195 | 11/2004 |
| WO | 01/31900 A2 | 5/2001 |
| WO | 2007/138938 A1 | 12/2007 |

OTHER PUBLICATIONS

Proceter et al., An approach to Call Park/Retreive using SIP, Feb. 26, 2007, Network Working Group, draft-procter-bliss-call-park-extension-00.*
ITU-T, Call park and call pickup supplementary services for H.323, May 1999, International Telecommunication Union, H.450.5, pp. 13-14.*
English language International Search Report for PCT/JP2008/052187, mailed on Mar. 11, 2008.

* cited by examiner

*Primary Examiner* — Nicholas Jensen
(74) *Attorney, Agent, or Firm* — Staas & Halsey LLP

(57) ABSTRACT

A request destination management table that stores therein a service ID uniquely identifying a service being interrelated with a request destination to which execution of a service is requested and a report destination management table that stores therein a call ID uniquely identifying a call being interrelated with a report destination of a call state transition report indicative of state transition of the call are provided. An IP telephone receives a request for a supplementary service, obtains a request destination corresponding to a service ID of the supplementary service from the request destination management table, and transfers the request for the supplementary service to the request destination. The IP telephone receives a call state transition report, obtains a report destination corresponding to a call ID of the call state transition report from the report destination management table, and transfers the call state transition report to the report destination.

12 Claims, 13 Drawing Sheets

REQUEST DESTINATION MANAGEMENT TABLE

| SERVICE ID | REQUEST DESTINATION |
|---|---|
| CALL PARK | Call Park() |
| CALL PICKUP | Pickup() |

REPORT DESTINATION MANAGEMENT TABLE

| CALL ID | SERVICE STATUS | REPORT DESTINATION |
|---|---|---|
| EXISTING | CALL PARK | UI |
| SPECIAL NUMBER | NORMAL | SERVICE EXTENSION UNIT |

IP TELEPHONE AND METHOD FOR CONTROLLING SUPPLEMENTARY SERVICES

CROSS-REFERENCE TO RELATED APPLICATION

This application is a continuation of International Application No. PCT/JP2008/052187, filed on Feb. 8, 2008, the entire contents of which are incorporated herein by reference.

FIELD

The embodiments discussed herein are directed to an IP telephone that receives requests of a user for execution of services and executes supplementary services that vary according to vendor.

BACKGROUND

The dissemination of dual-carrier cellular phones that have multiple communication bearers, such as WLAN and 3G, and the spread of fixed mobile convergence (FMC) services that are aimed at the integration of fixed-line and mobile telephones in recent years are expected to accompany an increase in the use of multiple IP telephony services, such as corporate and public networks, by a single user as disclosed in Japanese Laid-open Patent Publication No. 2004-328195. Such a case requires an IP telephone terminal of multi-vendor support that connects to multiple IP telephony services with a single telephone terminal.

For example, the use of session initiation protocol (SIP) as a call control protocol for IP telephony has become common, and sequences of basic services, such as terminal registration, conversation, call hold, and call transfer, have been implemented in much the same way due to standardization. However, supplementary services to be implemented (for example, call park, call pickup, setting and releasing of call forwarding, call queuing, and conference call) are not yet standardized and are, therefore, implemented in manners that are unique to each vendor.

This makes it difficult to develop a SIP stack that supports all of the supplementary services of respective vendors. To use the IP telephony services of multiple vendors with a single telephone terminal, an approach has been taken to individually develop SIP stacks that are specialized to the respective vendors and install the stacks in the terminal.

In the conventional art, the SIP stacks specialized to respective vendors are individually developed and installed in the telephone terminal, and therefore, the supplementary services of respective vendors are implemented by utilizing a wide variety of service sequences. Accordingly, the judgment for appropriately reporting call state transition varies depending on the service sequence.

More specifically, when carrying out basic services and supplementary services in an IP telephone terminal, a user interface (UI) requests the operation of a user, such as a request for supplementary services, from the SIP stack, and an SIP sequence executing unit of the SIP stack then sends and receives various SIP messages to execute the service sequence.

Furthermore, a significant change in state during the process of the service sequence is forwarded as a call state transition report to the UI, a higher-level module, and the UI makes a status report to the user to carry out various telephony services. The fact that the supplementary services of respective vendors are implemented by utilizing a wide variety of service sequences makes the judgment for appropriate reporting of call state transition different depending on the service sequence.

For example, there are two methods of SIP implementation to carry out call park as a supplementary service. One is to dial a second call to a special number using another signaling for control (control call) different from an existing call, and the other is to transfer an existing call to a special number for call park.

When developing a common SIP stack that can support these two types of implementations, in the method for dialing the second call to the special number, upon receiving a call establishment report for the second call, the UI (or the user thereof) needs to judge whether the report is of the call for "transfer" or the control call for "call park". On the other hand, in the method for transferring to the special number for call park, when the completion of transfer is reported to the UI, the UI (or the user thereof) needs to judge whether the transfer completion report is a report of transfer completion based on the call park or a transfer completion report as a basic service.

Consequently, the fact that the criterion for an appropriate call state transition report varies depending on the sequence of respective supplementary services causes a problem in that SIP stacks are developed individually, resulting in an increase in development man-hours and extremely inefficient development of a terminal supporting multiple vendors.

SUMMARY

According to an aspect of an embodiment of the invention, an IP telephone includes a user interface that receives a request of a user for execution of a service; a service extension unit that receives a request for execution of a supplementary service from the user interface and executes the supplementary service, the supplementary service varying according to vendor; a request destination management storage unit that stores in a request destination management storage a service identifier uniquely indentifying a service and a request destination to which execution of the service is requested being interrelated with each other; a report destination management storage unit that stores in a report destination management storage a call identifier uniquely identifying a call and a report destination of a call state transition report indicative of state transition of the call being interrelated with each other; a request transfer unit that receives a request for a supplementary service from the user interface, obtains the request destination corresponding to a service identifier of the supplementary service from the request destination management storage, and transfers the request for the supplementary service to the request destination; and a report transfer unit that receives the call state transition report, obtains the report destination corresponding to a call identifier of the call state transition report from the report destination management storage, and transfers the call state transition report to the report destination.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

[a] First Embodiment

In the following exemplary embodiment, the structure and the process flow of an IP telephone according to a first embodiment of the present invention will be described successively and the effects of the first embodiment will be described last.

Structure of IP Telephone

Figures 1, 2:
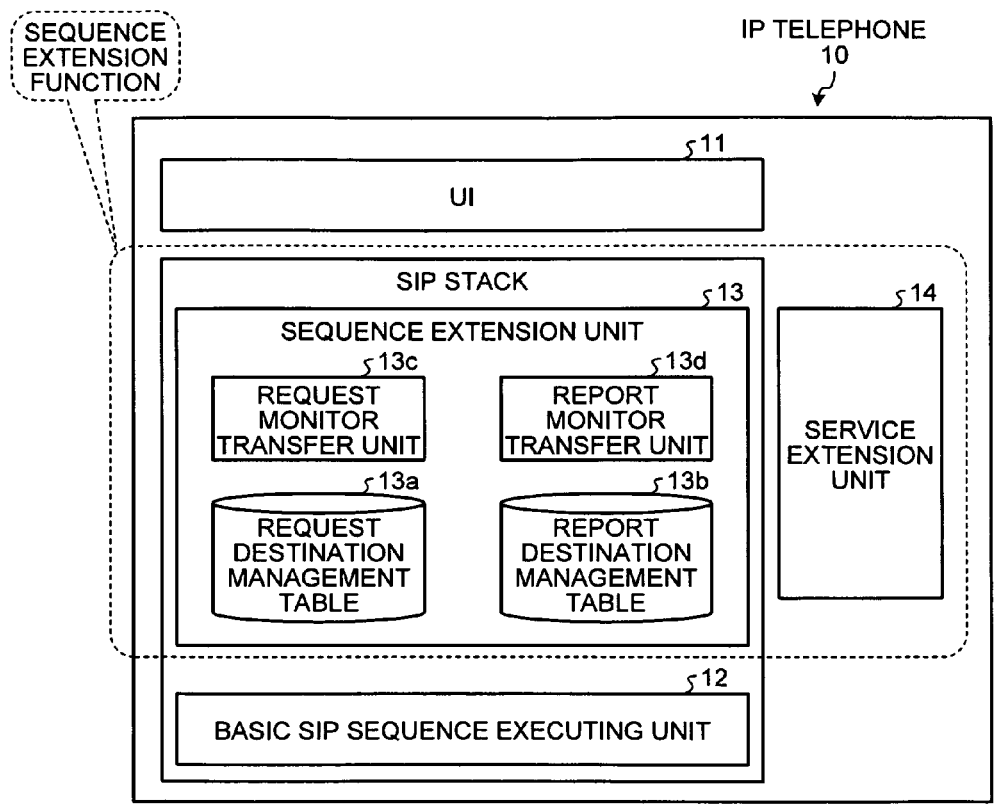
FIG. 1 is a block diagram illustrating the structure of an IP telephone according to a first embodiment of the present invention.
FIG. 2 is a schematic for explaining a request destination management table.

The structure of an IP telephone 10 according to the first embodiment will be explained with reference to FIG. 1. FIG. 1 is a block diagram illustrating the structure of the IP telephone 10 according to the first embodiment. As illustrated in FIG. 1, the IP telephone 10 includes a user interface (UI) 11, a basic SIP sequence executing unit 12, a sequence extension unit 13, and a service extension unit 14. The processes of the respective units are explained below.

The UI 11 receives a request for a supplementary service or the like by the operation of a user, and makes a request to the sequence extension unit 13. The UI 11 also receives a call state change report from the sequence extension unit 13 and outputs a status report to the user.

The basic SIP sequence executing unit 12 executes a basic service sequence. More specifically, the basic SIP sequence executing unit 12 sends and receives SIP messages in response to the sequence, and makes reports on changes of state in the course of the sequence as a call state transition report to the sequence extension unit 13.

The sequence extension unit 13 has an internal memory that stores therein computer programs that define various processing procedures and required data both with which the sequence extension unit 13 executes the process of sorting out service requests and call state transition reports. The sequence extension unit 13 includes, as ones closely related to the present invention in particular, a request destination management table 13a, a report destination management table 13b, a request monitor transfer unit 13c, and a report monitor transfer unit 13d.

The request destination management table 13a, as illustrated in FIG. 2, by interrelating the destination of a request to a service ID (for example, a function pointer), manages the request destination for a supplementary service. The request destination management table 13a is created, when a SIP stack is initialized, by reading out and storing a request destination entry for each of the service IDs from the service extension unit 14, which will be described later.

Figures 3, 4:
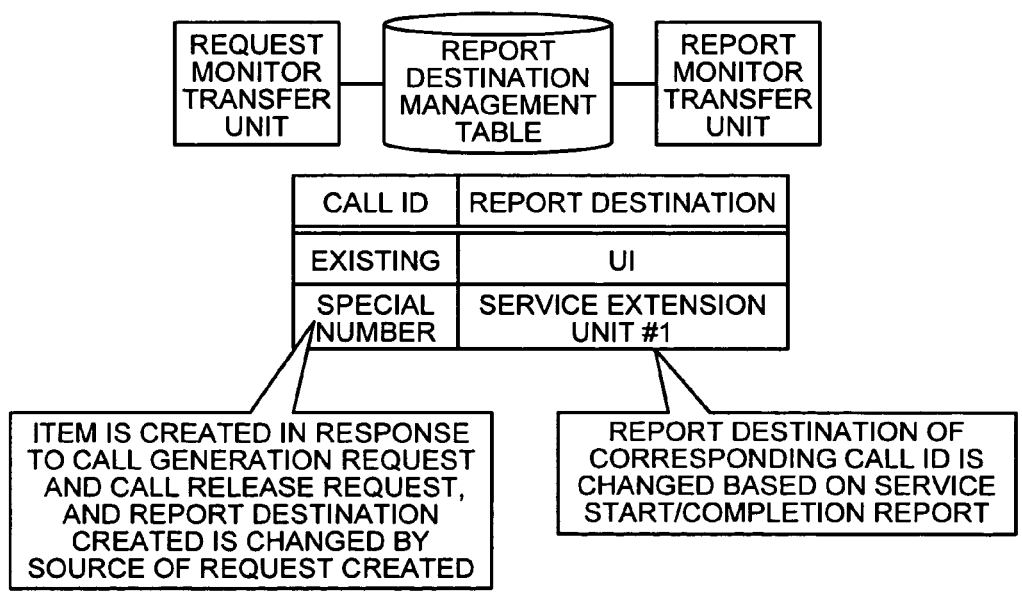
FIG. 3 is a schematic for explaining a report destination management table.
FIG. 4 is a schematic for explaining the creation and change of the report destination management table.

The report destination management table 13b, as illustrated in FIG. 3, by interrelating a service status and a report destination to a call ID, manages the report destination for a call state transition report. The report destination management table 13b is updated, as illustrated in FIG. 4, by the request monitor transfer unit 13c and the report monitor transfer unit 13d, which will be described later.

More specifically, for the "call ID" in the report destination management table 13b, an item is created in response to a call generation request and a call release request, and the report destination thus created is changed by the source of request that creates it. For the "service status" in the report destination management table 13b, the service status of the corresponding call ID is changed based on a service request and a service completion report. For the "report destination" in the report destination management table 13b, the report destination of the corresponding call ID is changed based on a service start report and the service completion report.

The request monitor transfer unit 13c monitors a supplementary service request and transfers the request by referring to the request destination management table 13a for the supplementary service. More specifically, the request monitor transfer unit 13c monitors the request source of service requests from the UI 11 and the basic SIP sequence executing unit 12, updates the report destination management table 13b, and refers to the request destination management table 13a to determine the request destination.

Figure 5:
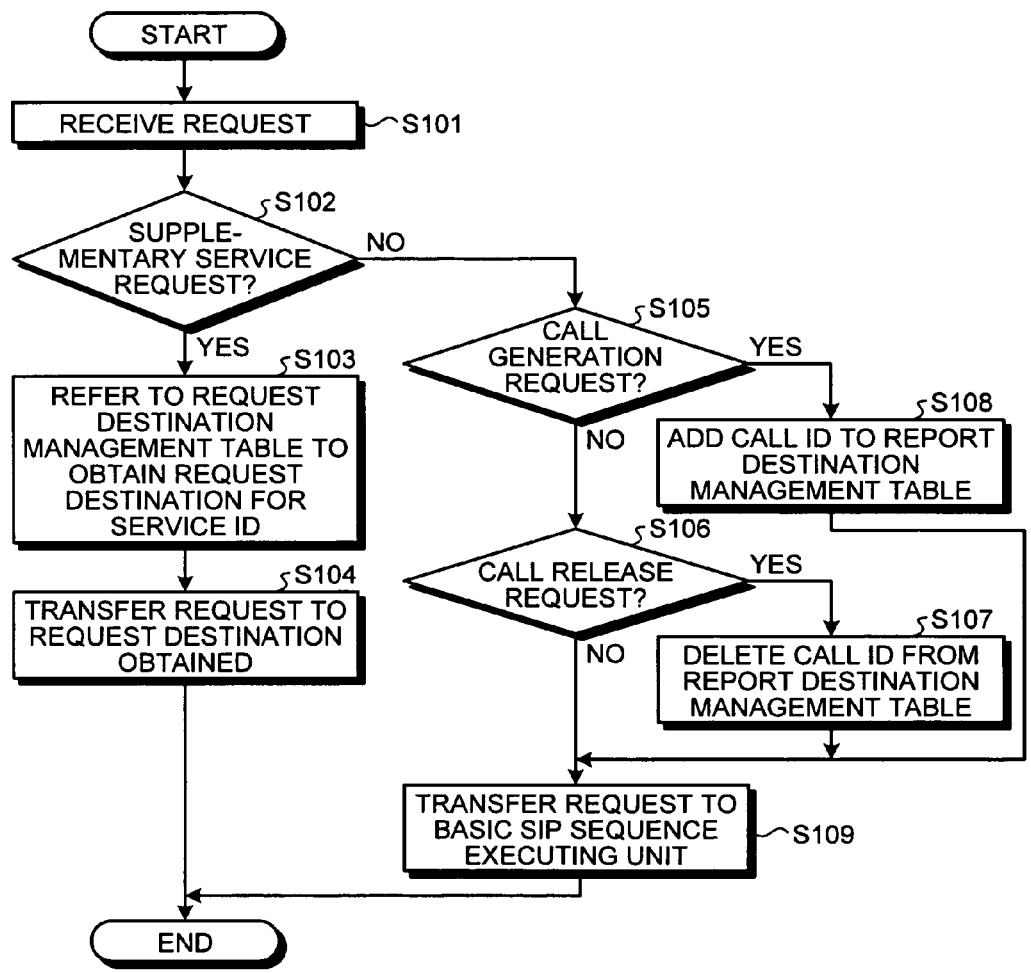
FIG. 5 is a flowchart for explaining the process flow performed by a request monitor transfer unit.

The process flow of the request monitor transfer unit 13c will be explained with reference to FIG. 5. As illustrated in FIG. 5, when the request monitor transfer unit 13c receives a request (Step S101), the request monitor transfer unit 13c determines whether it is a supplementary service request (Step S102). As a result, when it is a supplementary service request (Yes at Step S102), the request monitor transfer unit 13c refers to the request destination management table 13a to obtain the request destination based on the service ID (Step S103), and transfers the request to the request destination thus obtained (Step S104).

On the other hand, when it is not a supplementary service request (No at Step S102), the request monitor transfer unit 13c determines whether it is a call generation request (Step S105). As a result, when it is determined to be a call generation request (Yes at Step S105), the request monitor transfer unit 13c adds the call ID to the report destination management table 13b (Step S108) and transfers the request to the basic SIP sequence executing unit 12 (Step S109).

Furthermore, when it is determined not to be a call generation request (No at Step S105), the request monitor transfer unit 13c determines whether it is a call release request (Step S106). As a result, when it is a call release request (Yes at Step S106), the request monitor transfer unit 13c deletes the call ID from the report destination management table 13b (Step S107) and transfers the request to the basic SIP sequence executing unit 12 (Step S109). When it is not a call release request (No at Step S106), the request monitor transfer unit 13c transfers the request to the basic SIP sequence executing unit 12 without changing the report destination management table 13b (Step S109).

The report monitor transfer unit 13d monitors a report of call state transition and, when executing a supplementary service, refers to the report destination management table 13b for the call state transition to change the report destination. More specifically, the report monitor transfer unit 13d monitors the source of call state transition reports from the basic SIP sequence executing unit 12 and the service extension unit 14 and contents thereof, updates the report destination management table 13b, and refers to the report destination management table 13b to determine the report destination.

Figure 6:
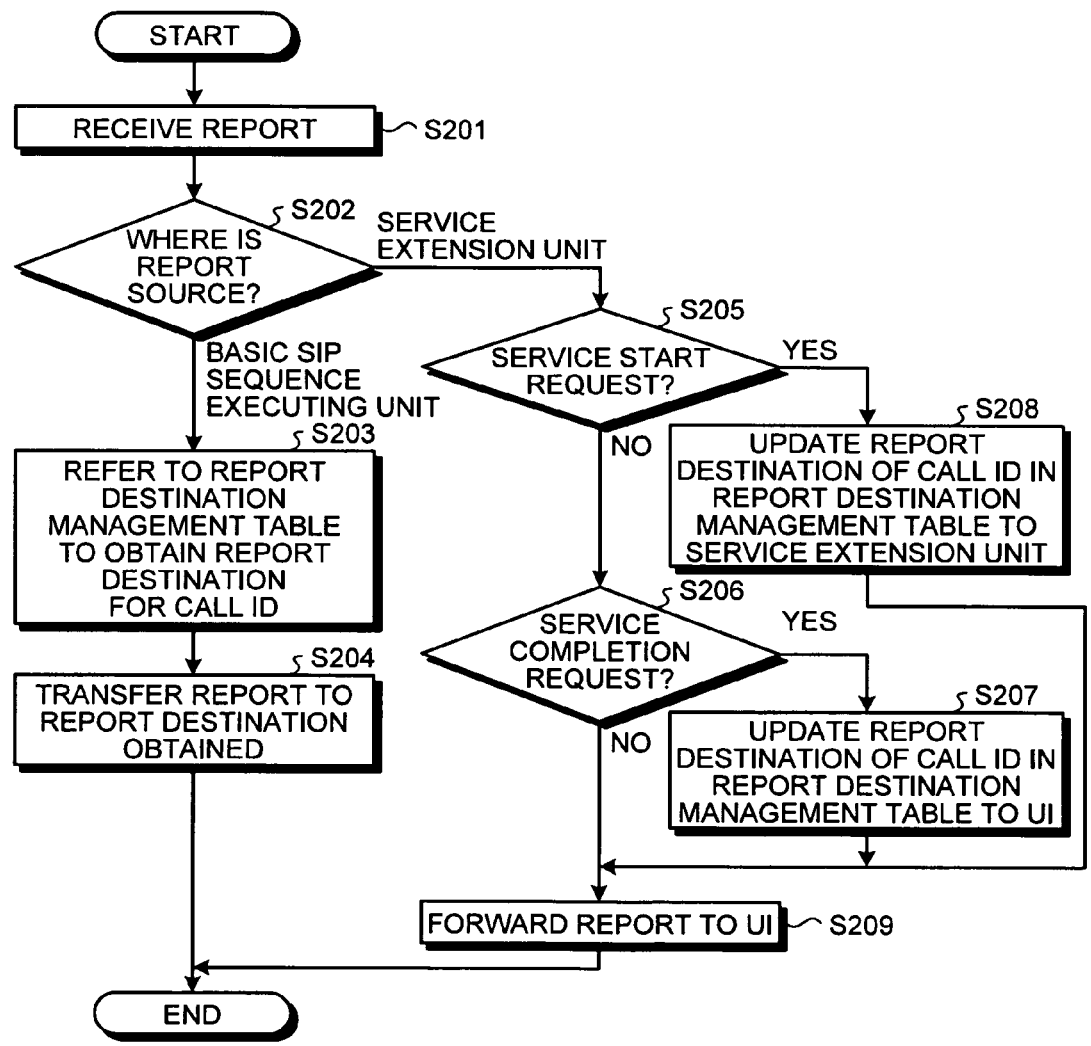
FIG. 6 is a flowchart for explaining the process flow performed by a report monitor transfer unit.

The process flow of the report monitor transfer unit 13d will be explained with reference to FIG. 6. As illustrated in FIG. 6, when the report monitor transfer unit 13d receives a call state change report (Step S201), the report monitor transfer unit 13d determines the location of the source of the report (Step S202). As a result, when the report source is the basic SIP sequence executing unit 12, the report monitor transfer unit 13d refers to the report destination management table 13b to obtain the report destination based on the call ID (Step S203) and transfers the report to the report destination thus obtained (Step S204).

Meanwhile, when the report source is the service extension unit 14, the report monitor transfer unit 13d determines whether it is a service start request (Step S205). When it is the service start request as a result (Yes at Step S205), the report monitor transfer unit 13d updates the report destination for the call ID in the report destination management table 13b to the service extension unit 14 (Step S208) and forwards the call state change report to the UI 11 (Step S209).

When it is not a service start request (No at Step S205), the report monitor transfer unit 13d determines whether it is a service completion request (Step S206). As a result, when it is a service completion request (Yes at Step S206), the report monitor transfer unit 13d updates the report destination for the call ID in the report destination management table 13b to the service extension unit 14 (Step S207) and forwards the call state change report to the UI 11 (Step S209).

Furthermore, when it is not a service completion request (No at Step S206), the report monitor transfer unit 13d forwards the call state change report to the UI 11 without changing the report destination management table 13b (Step S209).

Returning back to the explanation with reference to FIG. 1, the service extension unit 14 executes a supplementary service sequence. More specifically, when the service extension unit 14 executes a SIP service sequence in response to the call state transition reports received from the sequence extension unit 13, determining from the state of the SIP service sequence, the service extension unit 14 forwards only appropriate call state transition reports to the UI 11 through the sequence extension unit 13. The service extension unit 14 has different configurations and processes depending on the intended supplementary service implementations and vendors.

Figure 7:
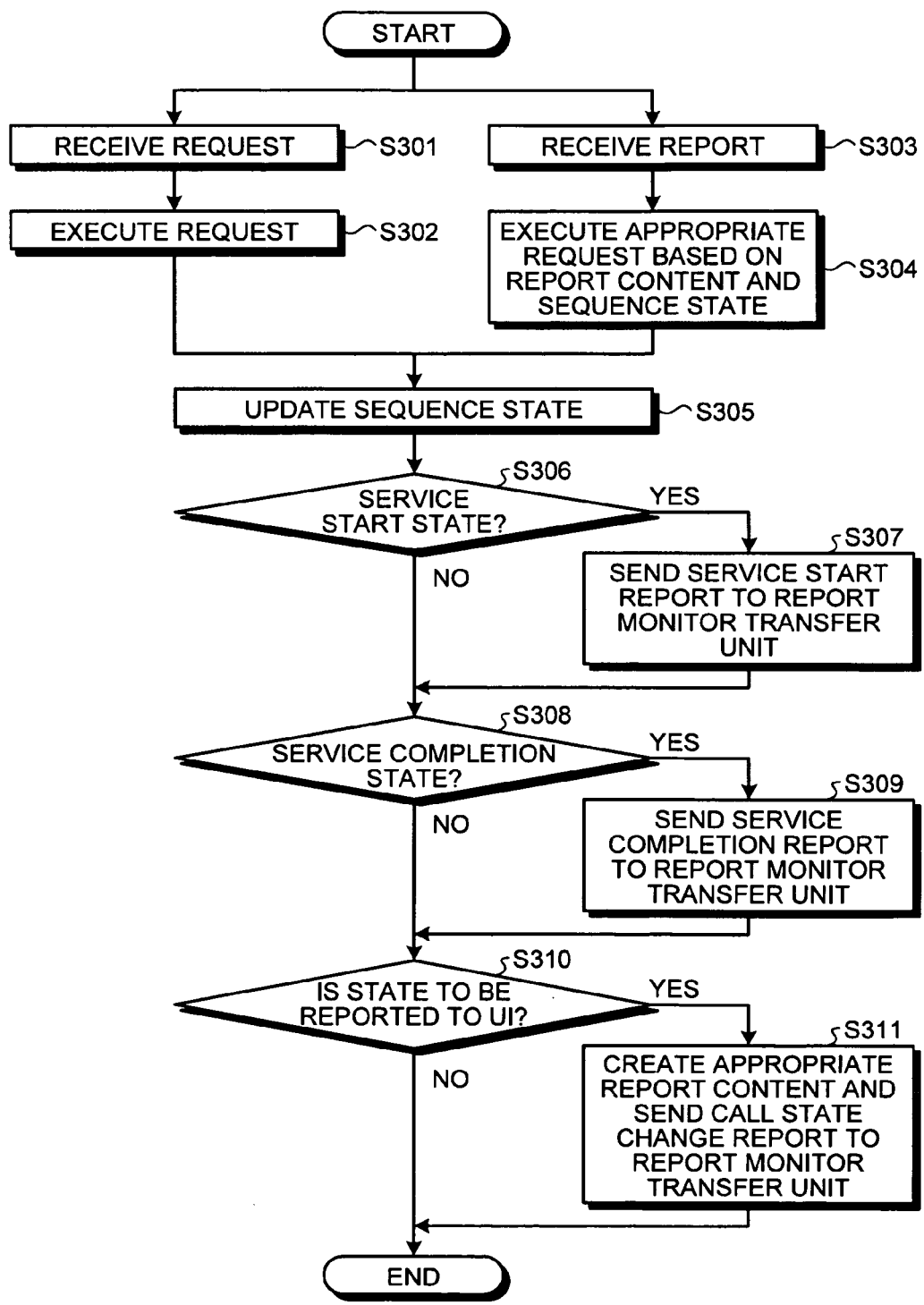
FIG. 7 is a flowchart for explaining the process flow performed by a service extension unit.

The process flow of the service extension unit 14 will be explained with reference to FIG. 7. As illustrated in FIG. 7, when the service extension unit 14 receives a request from the sequence extension unit 13 (Step S301), the service extension unit 14 executes the request (Step S302). When the service extension unit 14 receives a report from the sequence extension unit 13 (Step S303), the service extension unit 14 executes the appropriate request based on the content of the report and the state of the sequence (Step S304), and then updates the state of the sequence (Step S305). The execution of the requests at Steps S302 and S304 is a process that varies according to the supplementary services of the respective vendors implemented.

The service extension unit 14 then determines whether it is in a service start state (Step S306) and, when it is in a service start state (Yes at Step S306), sends a service start report to the report monitor transfer unit 13d (Step S307).

Then, the service extension unit 14 determines whether it is in a service completion state (Step S308) and, when it is in the service completion state (Yes at Step S308), sends a service completion report to the report monitor transfer unit 13d (Step S309).

Thereafter, the service extension unit 14 judges whether it is a state to be reported to the UI 11 (Step S310) and, when it is judged that the state is to be reported to the UI 11 (Yes at Step S310), creates an appropriate report content and sends the call state change report to the report monitor transfer unit 13d (Step S311). The determination and the creation of report content at Steps S310 and S311 are processes that vary according to the supplementary services of the respective vendors implemented.

Sending and receiving of requests and reports between each of the constituent units will be explained with specific examples and with reference to FIG. 8. In the example illustrated in FIG. 8, the service extension unit 14 is implemented with service extensions "call park (CallPark ( ))" and "call pickup (Pickup ( ))" as the supplementary services. The request destination management table 13a in the sequence extension unit 13 interrelates and stores therein the service IDs "call park" and "call pickup" with the request destinations of "CallPark ( )" and "Pickup ( )", respectively.

Figure 8:
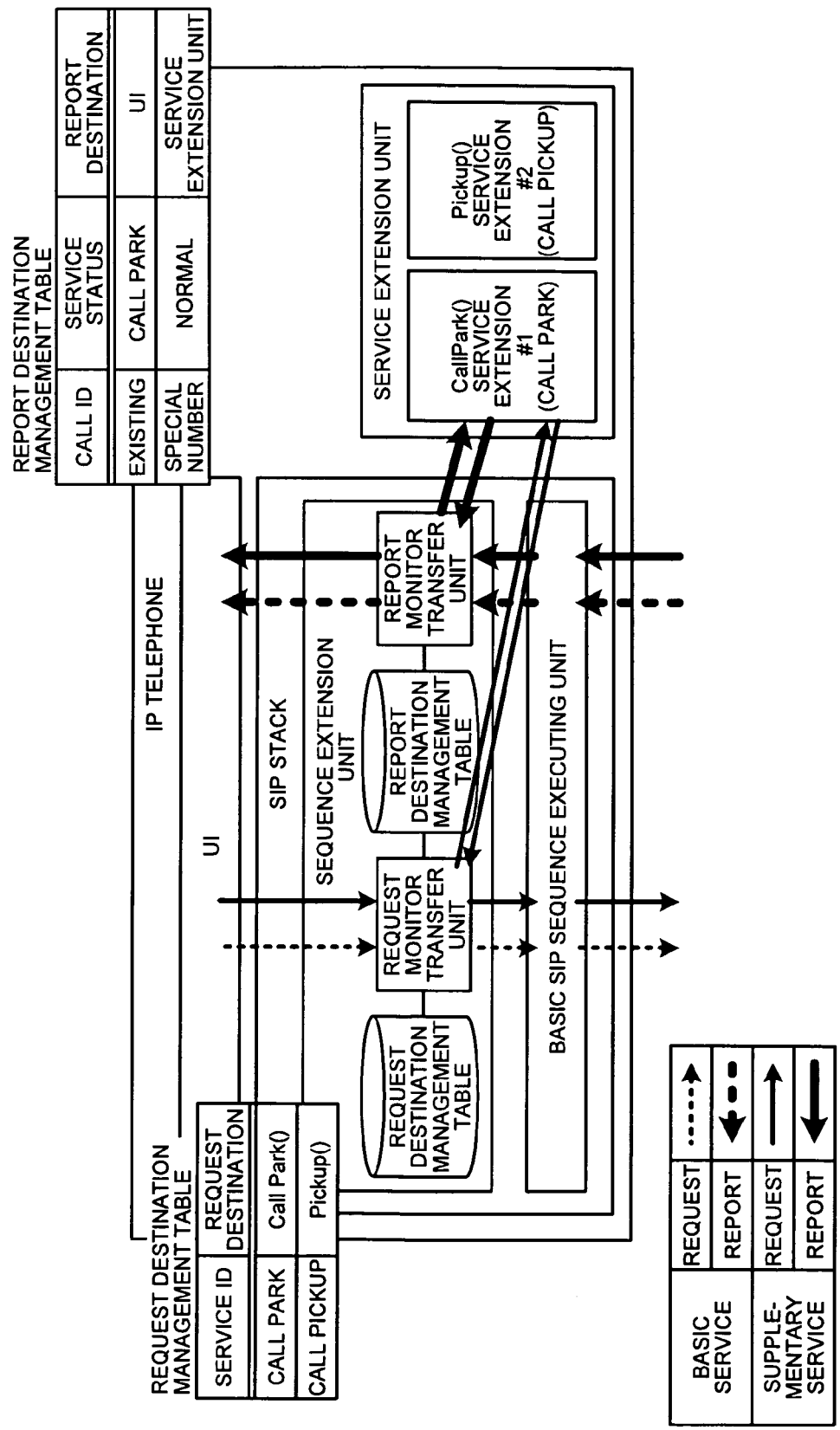
FIG. 8 is a schematic for explaining requests and reports sent and received between respective constituent units with specific examples.

As illustrated in FIG. 8, the request monitor transfer unit 13c in the sequence extension unit 13 receives a request from the UI 11 and, when it is not a supplementary service request, transfers the request to the basic SIP sequence executing unit 12. When it is a request for the supplementary service "call park", the request monitor transfer unit 13c refers to the request destination management table 13a to obtain the request destination "CallPark ( )" that corresponds to the service ID "call park". The request monitor transfer unit 13c then transfers the request to the "CallPark ( )" in the service extension unit 14 that is the request destination thus obtained.

The report monitor transfer unit 13d receives a call state change report from the basic SIP sequence executing unit 12 or the service extension unit 14. When the report is received from the service extension unit 14, the report monitor transfer unit 13d updates the report destination management table 13b and reports to the UI 11.

In contrast, when the report is received from the basic SIP sequence executing unit 12, the report monitor transfer unit 13d refers to the report destination management table 13b to obtain the report destination for the call ID and transfers the report to the report destination thus obtained. In other words, in the example illustrated in FIG. 8, the report monitor transfer unit 13d reports to the UI 11 when the call ID is "existing" and, when the call ID is "special number", reports to the service extension unit 14.

Process of IP Telephone

Figure 9:
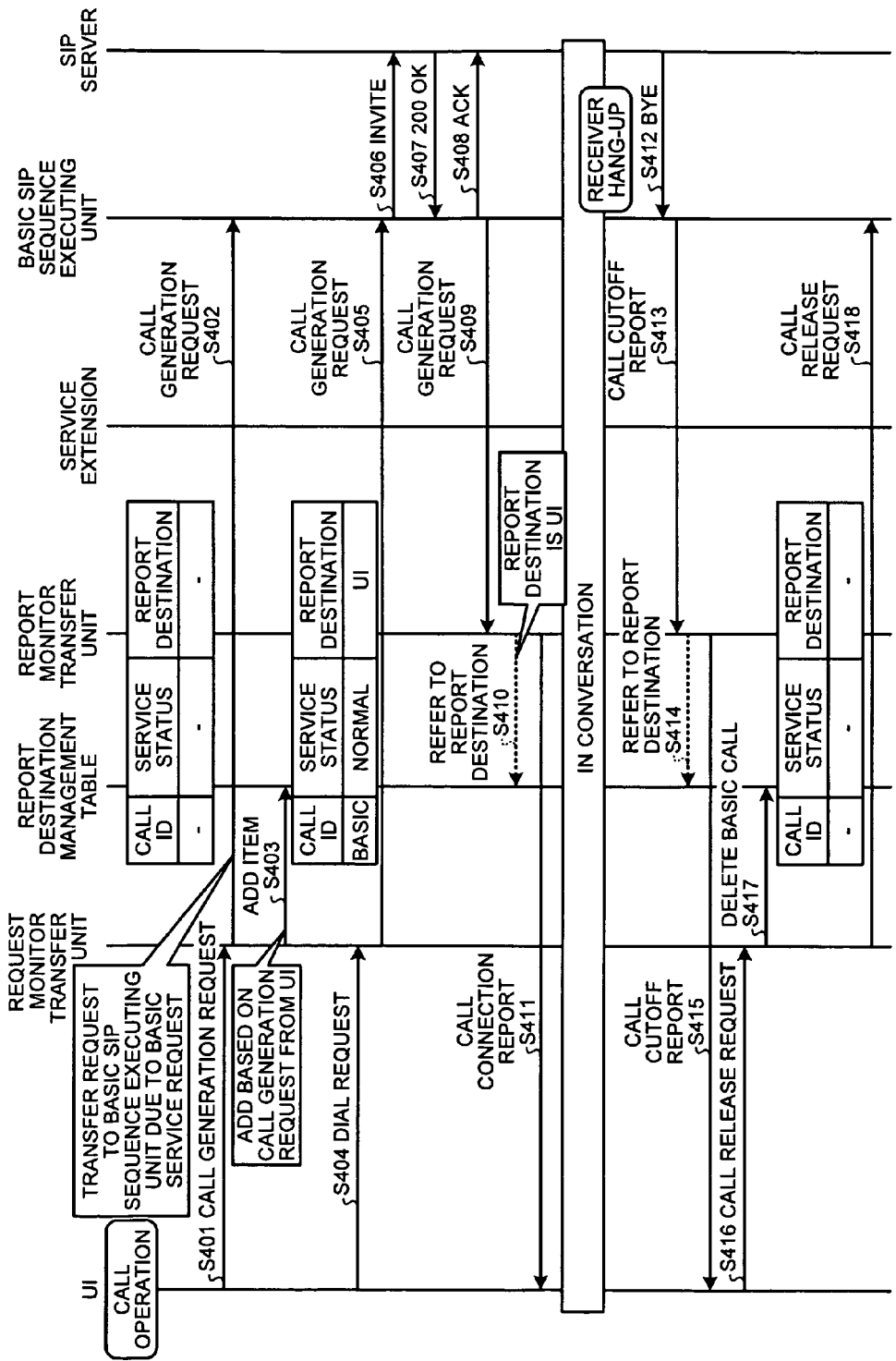
FIG. 9 is a sequence diagram illustrating the process flow of a basic call and receiver hang-up performed by the IP telephone according to the first embodiment.
Figure 10:
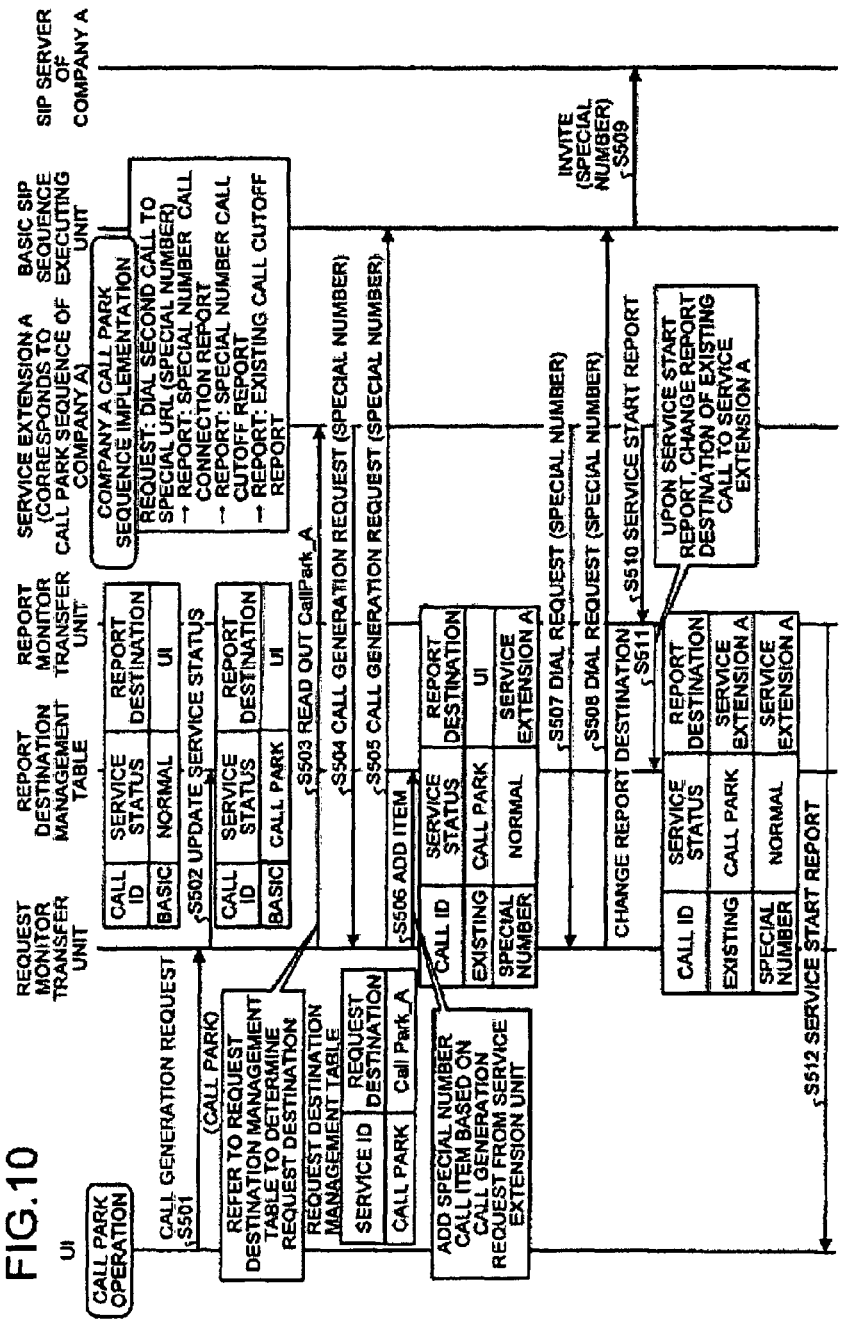
FIG. 10 is a sequence diagram illustrating the process flow of a supplementary service (call park) performed by the IP telephone according to the first embodiment.
Figure 11:
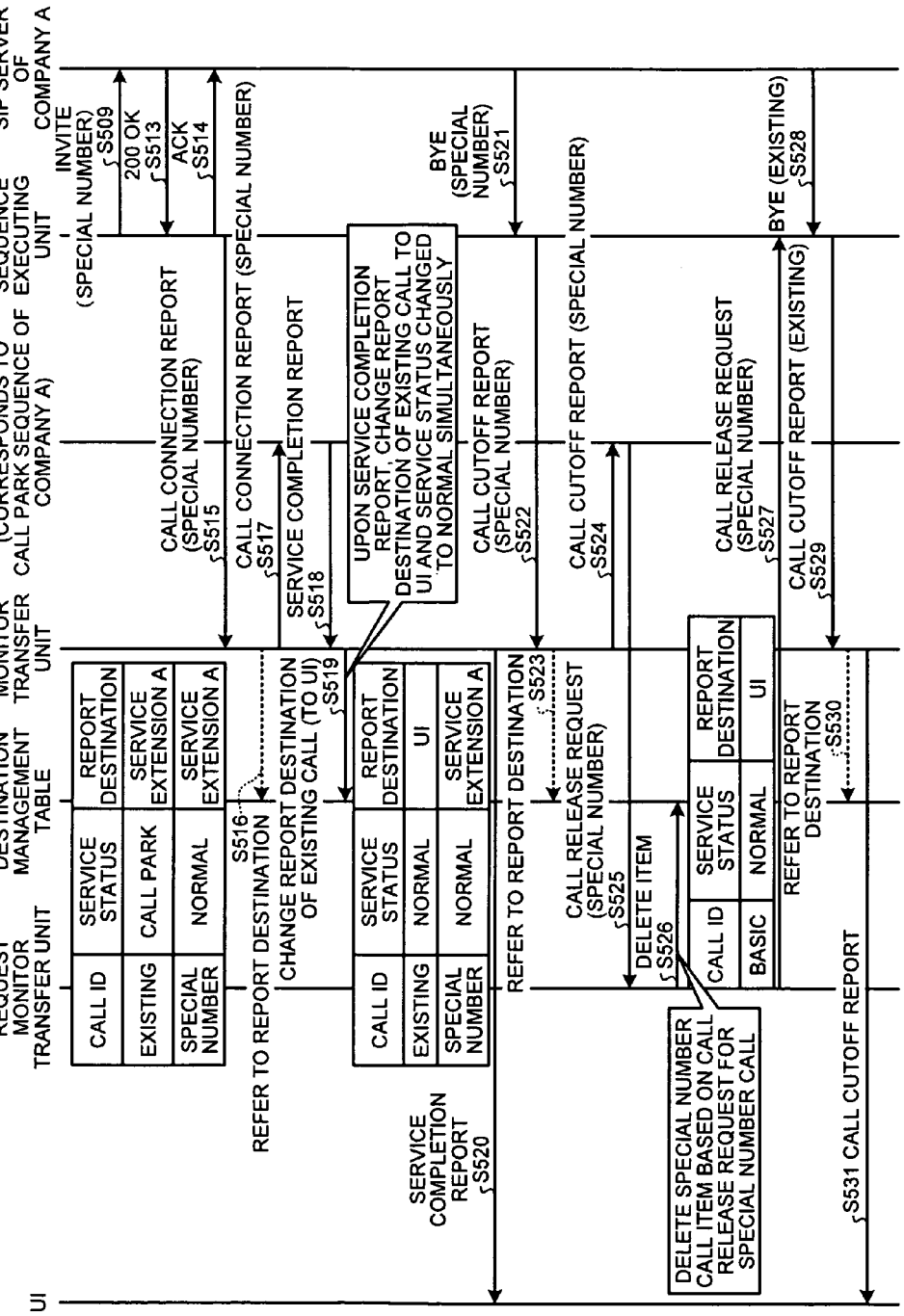
FIG. 11 is a sequence diagram illustrating the process flow of the supplementary service (call park) performed by the IP telephone according to the first embodiment.
Figure 12:
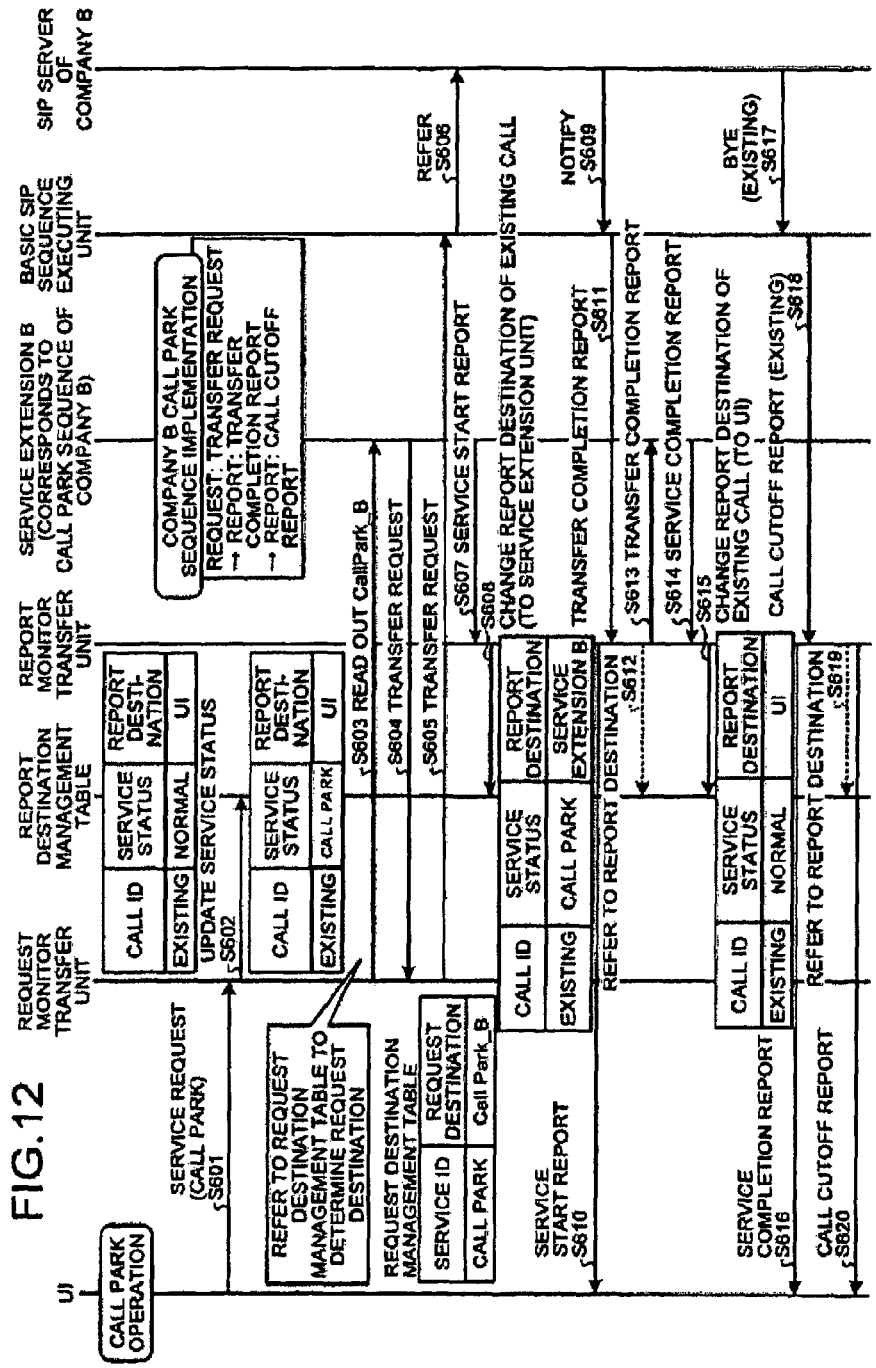
FIG. 12 is a sequence diagram illustrating the process flow of a supplementary service (call pickup) performed by the IP telephone according to the first embodiment.

The processes of the IP telephone 10 according to the first embodiment will be explained with reference to FIGS. 9 to 12. FIG. 9 is a sequence diagram illustrating the process flow of a basic call and receiver hang-up performed by the IP telephone according to the first embodiment. FIGS. 10 and 11 are sequence diagrams illustrating the process flow of a supplementary service (call park) performed by the IP telephone according to the first embodiment. FIG. 12 is a sequence diagram illustrating the process flow of the supplementary service (call pickup) performed by the IP telephone according to the first embodiment.

As illustrated in FIG. 9, when the request monitor transfer unit 13c of the IP telephone 10 receives a call generation request from the UI 11 (Step S401), the request monitor transfer unit 13c judges that it is a basic service request, transfers the call generation request to the basic SIP sequence executing unit 12 (Step S402) and, based on the call generation request from the UI 11, adds the call ID to the report destination management table 13b (Step S403).

When the request monitor transfer unit 13c receives a dial request from the UI 11 (Step S404), the request monitor transfer unit 13c transfers the request to the basic SIP sequence executing unit 12 (Step S405). When the basic SIP sequence executing unit 12 receives the dial request, the basic SIP sequence executing unit 12 carries out a call connection process with a SIP server (Steps S406 to S408) and, after the connection is completed, sends out a call connection report to the report monitor transfer unit 13d (Step S409).

The report monitor transfer unit 13d refers to the report destination management table 13b (Step S410) to obtain the report destination (report destination "UI" in the example illustrated in FIG. 9) and forwards the call connection report to the UI 11 (Step S411).

After the existing call is finished, when the basic SIP sequence executing unit 12 receives a call cutoff "BYE" from the SIP server (Step S412), the basic SIP sequence executing unit 12 sends a call cutoff report to the report monitor transfer unit 13d (Step S413). The report monitor transfer unit 13d then refers to the report destination management table 13b (Step S414) to obtain the report destination (report destination "UI" in the example illustrated in FIG. 9) and forwards the call cutoff report to the UI 11 (Step S415).

Thereafter, when the request monitor transfer unit 13c receives a call release request from the UI 11 (Step S416), the request monitor transfer unit 13c deletes the call ID from the report destination management table 13b (Step S417) and transfers the call release request to the basic SIP sequence executing unit 12 (Step S418).

The process flow of a supplementary service (call park) will be explained, referring next to FIGS. 10 and 11, with an example of the use of a control call for a second call for a call park with the IP telephone according to the first embodiment. As illustrated in FIG. 10, when the request monitor transfer unit 13c of the IP telephone 10 receives a service request for call park from the UI 11 (Step S501), the request monitor transfer unit 13c updates the service status in the report destination management table 13b based on the service request (Step S502).

The request monitor transfer unit 13c then refers to the request destination management table 13a to determine the request destination ("CallPark_A" in the example illustrated in FIG. 10) and reads out "CallPark_A" in the service extension unit 14 (Step S503). Then, the request monitor transfer unit 13c receives a call generation request for a special number from the service extension unit 14 (Step S504), transfers the call generation request to the basic SIP sequence executing unit 12 (Step S505), and adds an item for the call ID "special number" based on the call generation request for the special number (Step S506).

The request monitor transfer unit 13c receives a dial request for the second call to the special number from the service extension unit 14 (Step S507) and transfers the dial request to the basic SIP sequence executing unit 12 (Step S508). Thereafter, the basic SIP sequence executing unit 12 sends out "INVITE" to the SIP server as a second call connection process (Step S509).

When the report monitor transfer unit 13d receives a service start report from the service extension unit 14 (Step S510), with the service start report as a trigger, the report monitor transfer unit 13d changes the report destination of the existing call to the service extension unit 14 (Step S511). Thereafter, the report monitor transfer unit 13d transfers the service start report to the UI 11 (Step S512). Consequently, all subsequent call state transition reports are sent to the service extension unit 14, thereby allowing the service extension unit 14 to execute a supplementary service sequence.

As illustrated in FIG. 11, after sending INVITE to the SIP server (Step S509 illustrated in FIG. 10), the basic SIP sequence executing unit 12 carries out the second call connection (Steps S513 and S514) and sends a call connection report for the special number to the report monitor transfer unit 13d (Step S515). The report monitor transfer unit 13d then refers to the report destination management table 13b (Step S516), and forwards the call connection request for the special number to the corresponding report destination (Step S517).

When the report monitor transfer unit 13d receives a service completion report from the service extension unit 14 (Step S518), the report monitor transfer unit 13d changes the report destination of the existing call to the UI (Step S519) and forwards the service completion report to the UI 11 (Step S520).

Thereafter, when the basic SIP sequence executing unit 12 receives a call cutoff "BYE" for the special number from the SIP server (Step S521), the report monitor transfer unit 13d receives a call cutoff report for the special number from the basic SIP sequence executing unit 12 (Step S522), refers to the report destination management table 13b (Step S523) to obtain the report destination ("service extension A" in the example illustrated in FIG. 11), and forwards the call cutoff report to the service extension A in the service extension unit 14 (Step S524).

When the request monitor transfer unit 13c receives a call release request for the special number from the service extension unit 14 (Step S525), the request monitor transfer unit 13c deletes the item in the report destination management table 13b (item of call ID "special number" in the example illustrated in FIG. 11) based on the call release request (Step S526). The request monitor transfer unit 13c then transfers the call release request to the basic SIP sequence executing unit 12 (Step S527).

Subsequently, when the basic SIP sequence executing unit 12 receives a call cutoff "BYE" for the existing call from the SIP server (Step S528), the basic SIP sequence executing unit 12 sends a call cutoff report for the existing call to the report monitor transfer unit 13d (Step S529). Upon receiving the call cutoff report for the existing call, the report monitor transfer unit 13d refers to the report destination management table 13b (Step S530) to obtain the report destination ("UI" in the example illustrated in FIG. 11) and transfers the call cutoff report to the UI 11 (Step S531).

The process flow of a supplementary service (call pickup) will be explained with reference to FIG. 12 as an example of transferring an existing call to a special number for call park with the IP telephone according to the first embodiment. As illustrated in FIG. 12, when the request monitor transfer unit 13c receives a request for the call park as the supplementary service from the UI 11 (Step S601), the request monitor transfer unit 13c updates the service status in the report destination management table 13b based on the service request (Step S602).

The request monitor transfer unit 13c refers to the request destination management table 13a to determine the request destination ("CallPark_B" in the example illustrated in FIG. 12) and reads out "CallPark_B" in the service extension unit 14 (Step S603). The request monitor transfer unit 13c receives a transfer request from the service extension unit 14 (Step S604) and transfers the transfer request to the basic SIP sequence executing unit 12 (Step S605).

The basic SIP sequence executing unit 12 then sends "REFER" for requesting transferring the existing call to the special number for the call park to the SIP server (Step S606). When the report monitor transfer unit 13d receives a service start report from the service extension unit 14 (Step S607), the report monitor transfer unit 13d changes the report destination for the call ID "existing" in the report destination management table 13b to "service extension B" (Step S608).

Thereafter, when the basic SIP sequence executing unit 12 receives "NOTIFY" indicating that the transfer from the SIP server is completed (Step S609), the report monitor transfer unit 13d forwards the service start report to the UI 11 (Step S610).

When the report monitor transfer unit 13d receives the transfer completion report from the basic SIP sequence executing unit 12 (Step S611), the report monitor transfer unit 13d refers to the report destination management table 13b to obtain the report destination "service extension B" for the call ID "existing" (Step S612) and transfers the transfer completion report to the service extension unit 14 (Step S613). When the report monitor transfer unit 13d receives a service completion report from the service extension unit 14 (Step S614), the report monitor transfer unit 13d changes the report destination for the existing call to "UI" (Step S615) and transfers the service completion report to the UI 11 (Step S616).

Subsequently, when the basic SIP sequence executing unit 12 receives a call cutoff "BYE" for the existing call from the SIP server (Step S617), the report monitor transfer unit 13d receives a call cutoff report from the basic SIP sequence executing unit 12 (Step S618), refers to the report destination management table 13b to obtain the report destination "UI" for the call ID "existing" (Step S619), and forwards the call cutoff report to the UI 11 (Step S620).

Effects of First Embodiment

As described in the foregoing, the IP telephone 10 allows the call state transition reports to the UI 11, a higher-level module, to be handled in a common manner even when executing the supplementary services of different SIP implementations. This makes it possible to support various supplementary services of multiple vendors by developing sequences only for the supplementary services without developing the UI or overall SIP stacks separately, and to improve efficiency of developing SIP stacks that support multiple vendors.

According to the first embodiment, the service extension unit 14 being implemented with different modules enables, development by those other than terminal developing vendors, such as development by the vendors of IP telephony service providers, and also allows the expansion of functions, such as supporting a new service by the addition or replacement of modules, to be easily realized. Furthermore, when multiple vendors are supported, owing to an increasing number of commonly usable modules available such as SIP stacks, the storage areas of the terminal and consumption of memory areas can be reduced, thereby making the present invention advantageous for a portable IP telephone terminal that has less operation resources as well.

[b] Second Embodiment

Although the exemplary embodiment of the present invention has been explained up until now, the present invention can be embodied in various different embodiments other than the exemplary embodiment described above. Accordingly, another exemplary embodiment to be included in the present invention is described below as a second embodiment of the present invention.

(1) Vendor ID

The present invention is not limited to the exemplary embodiment described herein, and a module management table that manages module IDs for the combinations of a vendor ID uniquely identifying a vendor and a service ID uniquely identifying service contents may be provided.

Figure 13:
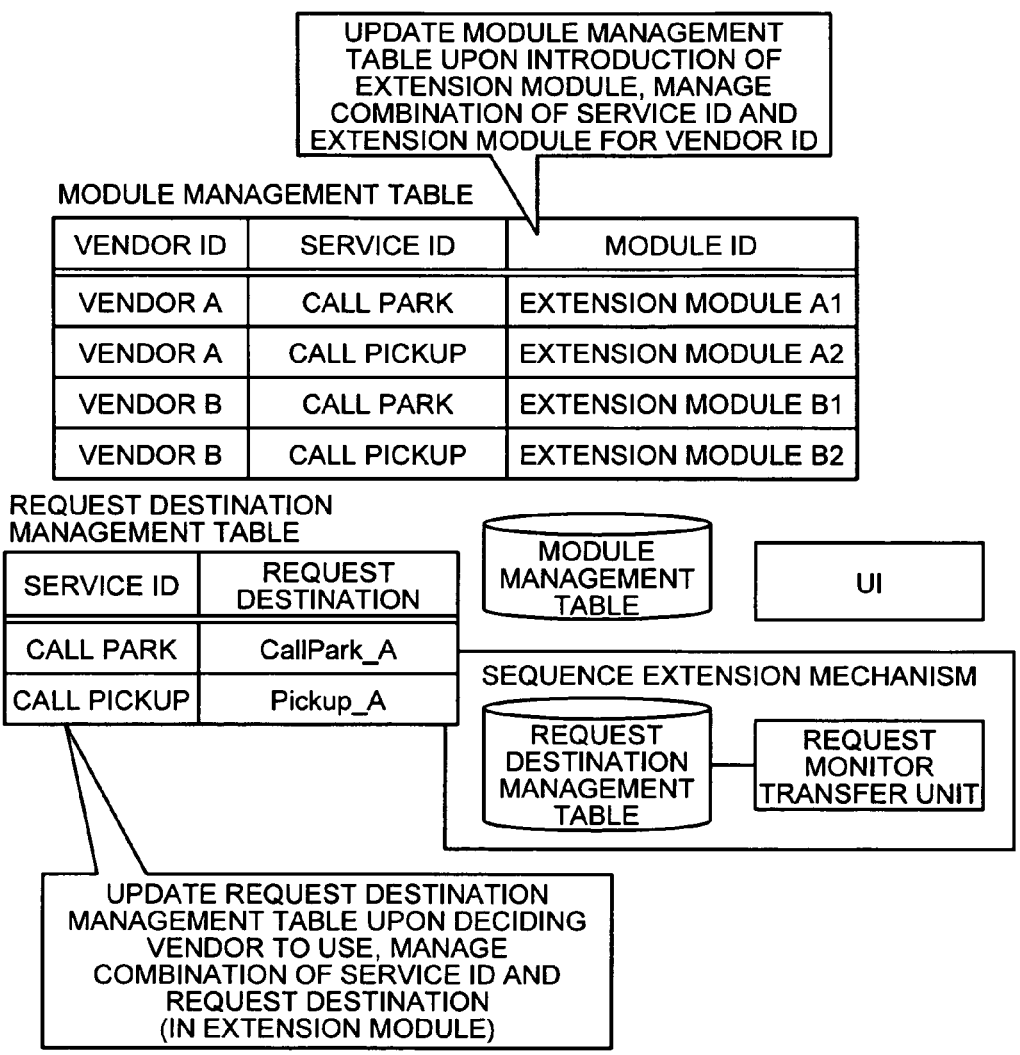
FIG. 13 is a schematic for explaining an IP telephone according to a second embodiment of the present invention.

More specifically, as illustrated in FIG. 13, the module management table of the IP telephone according to the second embodiment stores therein the respective vendor IDs, service IDs, and module IDs interrelated with one another. The module management table is updated, when a vendor extension module is introduced, by interrelating the extension module with the IDs of the intended vendor and service.

When the vendor used is determined, the IP telephone obtains a combination of the service ID and the extension module ID, which corresponds to the vendor ID of the determined vendor used, from the module management table so as to update the request destination management table. Then, the IP telephone obtains a request destination entry from the extension module ID and stores it in the request destination management table as a combination of the service ID and the request destination.

The fact that the module extension unit is structured by a plurality of modules and the transfer destination of a request is determined from the vendor ID and service ID makes it easy to support multiple vendors.

(2) Exclusive Control

Figure 14:
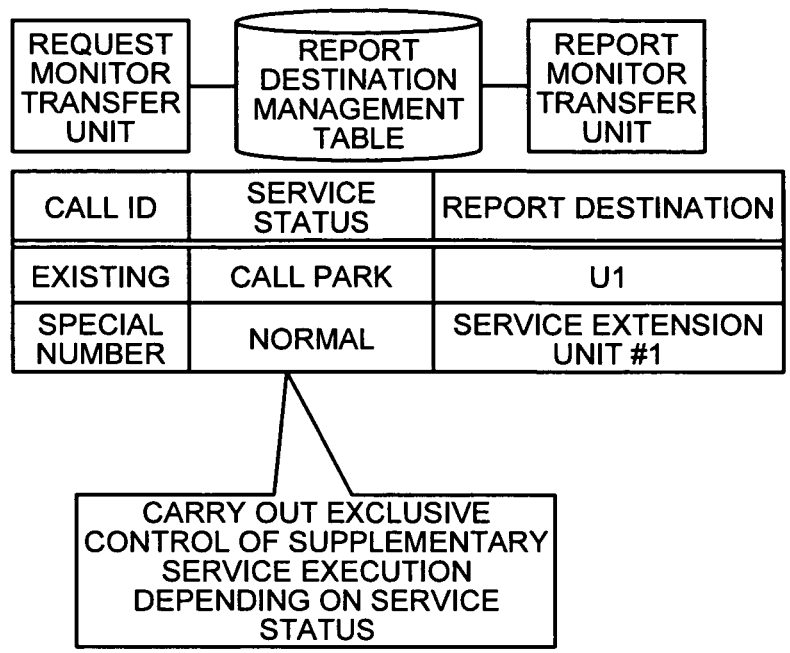
FIG. 14 is a schematic for explaining the IP telephone according to the second embodiment.

The present invention may be configured to carry out exclusive control over the execution of supplementary services by referring to the service status. More specifically, as illustrated in FIG. 14, when the request monitor transfer unit of the IP telephone according to the second embodiment receives a request for a supplementary service, the request monitor transfer unit refers to the service status of the corresponding service ID of the supplementary service in the report destination management table, and determines the availability of the service requested. For example, if the service is in progress, the IP telephone carries out exclusive control so as to reject the service request received.

(3) System Structure

Each of the constituent elements in the respective units illustrated in the drawings is functionally conceptual and is not necessarily needed to be physically structured as illustrated in the drawings. In other words, the specific embodiment of the distribution or integration of each unit is not limited to those illustrated in the drawings, and the whole or a part thereof can be structured functionally or physically distributed or integrated in any desirable unit depending on various loads and operating conditions. For example, the request monitor transfer unit 13c and the report monitor transfer unit 13d may be integrated. Furthermore, the whole or any part of each processing function carried out by the respective units may be realized by a CPU and computer programs that the CPU analyzes and executes, or realized as hardware by wired logic.

In the various processes described in the exemplary embodiments, the whole or a part of the processes described to be performed automatically may be carried out manually, or the whole or a part of the processes described to be carried out manually may be performed automatically with a known method. The processing procedures, controlling procedures, specific names, and information containing various data and parameters, all of which are explained in the foregoing and in the drawings, may be changed in any desirable manner unless otherwise specifically noted.

(4) Computer Program

Figure 15:
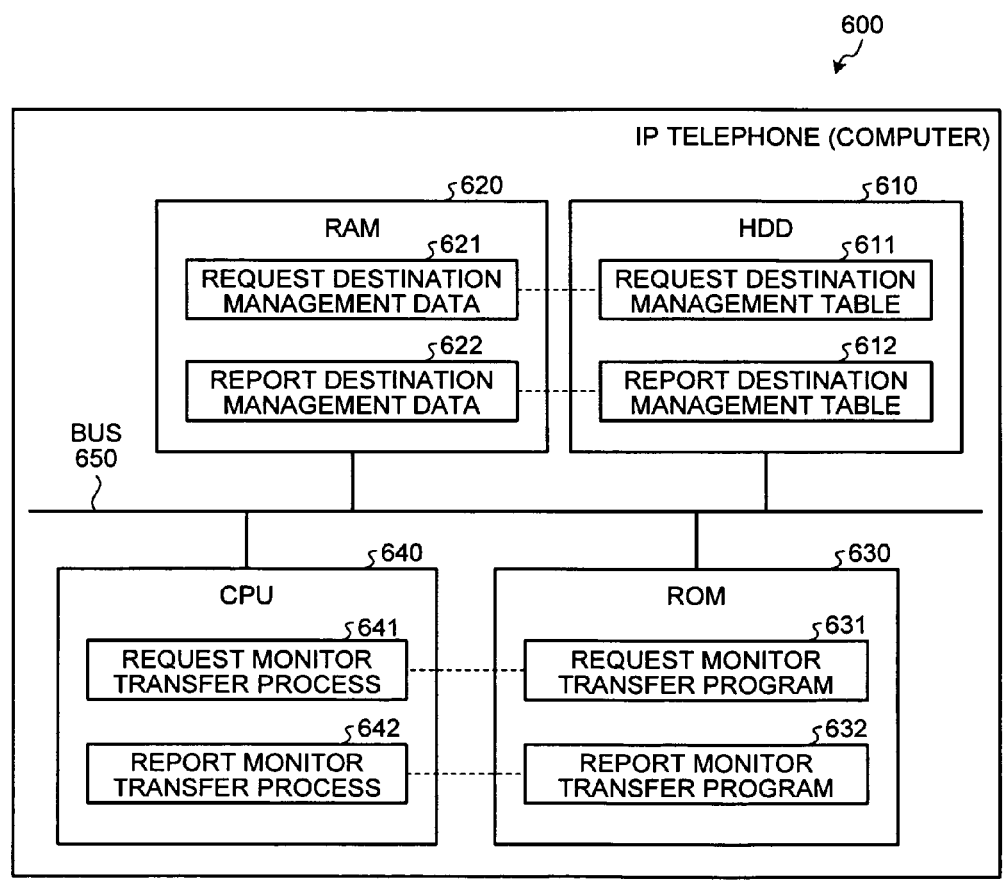
FIG. 15 is a schematic illustrating a computer that runs a supplementary services control program.

The various processes described in the exemplary embodiments can be realized by running a prearranged computer program on a computer. In the following, an example of a computer that runs computer programs with similar functionalities to the exemplary embodiments will be explained with reference to FIG. 15. FIG. 15 is a schematic illustrating a computer that runs a supplementary services control program.

As illustrated in FIG. 15, this computer 600 as an IP telephone is structured with an HDD 610, a RAM 620, a ROM 630, and a CPU 640 interconnected with one another via a bus 650.

In the ROM 630, an IP telephone that exercises similar functionalities to those of the exemplary embodiments, in other words, as illustrated in FIG. 15, a request monitor transfer program 631 and a report monitor transfer program 632 are loaded in advance. Additionally, the programs 631 and 632, similar to each of the constituent elements of the IP telephone illustrated in FIG. 1, may be integrated or distributed appropriately.

The CPU 640 reads out these programs 631 and 632 from the ROM 630 and executes them in order that the programs 631 and 632 function, as illustrated in FIG. 15, as a request monitor transfer process 641 and a report monitor transfer process 642, respectively. The processes 641 and 642 correspond to the request monitor transfer unit 13c and the report monitor transfer unit 13d illustrated in FIG. 1, respectively.

In the HDD 610, as illustrated in FIG. 15, a request destination management table 611 and a report destination management table 612 are provided. The request destination management table 611 and the report destination management table 612 correspond to the request destination management table 13a and the report destination management table 13b illustrated in FIG. 1, respectively. The CPU 640 carries out the processes of registering data to the request destination management table 611 and the report destination management table 612, reading out request destination management data 621 and report destination management data 622 from the request destination management table 611 and the report destination management table 612, respectively, storing them into the RAM 620, and managing information based on the request destination management data 621 and the report destination management data 622 stored in the RAM 620.

In an apparatus disclosed herein, when carrying out the supplementary services, the apparatus advances the service sequence by receiving a call state transition report generated by the SIP stack, determines to forward an appropriate call state transition report to the higher-level module based on the state of the service sequence, and switches the criterion depending on the supplementary service requested.

For example, for the call park, in the method for dialing the second call to the special number, the criterion is defined not to forward the call state transition report of the second call, which is a control call for the call park, to the higher-level module, but to forward a call connection report as a completion report of the call park. Meanwhile, in the method for transferring to the special number for the call park, the criterion is defined to transfer a transfer completion report to the higher-level module as a report of call park completion, making it possible to switch the criterion depending on the implementations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An Internet Protocol (IP) telephone comprising:
a report destination management table that is set therein (a) a call identifier uniquely identifying a call, (b) service status, and (c) a report destination of a call state transition report being interrelated with each other, the report destination being determined based on the call identifier and the service status, the call state transition report indicating call state transition for every call identifier, the service status indicating a supplementary service, the supplementary service including at least one of call park and call pickup;
a report transfer unit that receives the call state transition report, obtains the report destination corresponding to a call identifier of the received call state transition report from the report destination management table, and transfers the received call state transition report to the obtained report destination; and
a module management table including a vendor identifier uniquely identifying a vendor, a service identifier of the vendor, and a module identifier uniquely identifying a module that executes the service.

2. The IP telephone according to claim 1, further comprising:
a user interface that receives a request of a user for execution of a service;
a request destination management table that is set therein a service identifier uniquely identifying a service and a request destination to which execution of the service is requested being interrelated with each other; and
a request transfer unit that receives a request for the supplementary service from the user interface, obtains the request destination corresponding to a service identifier of the supplementary service from the request destination management table, and transfers the request for the supplementary service to the obtained request destination,
wherein the request transfer unit receives a request for the basic service from the user interface and, when the request is a call generation request, adds an identifier for a call to be generated to the report destination management table and, when the request is a call release request, deletes an identifier for a call to be released from the report destination management table.

3. The IP telephone according to claim 1, wherein the report transfer unit updates the report destination management table such that a report destination of a call identifier for a service to be completed is set to the user interface when the received call state transition report is a service completion request report.

4. The IP telephone according to claim 2, wherein the request transfer unit refers to the service status set in the report destination management table when a request for a service is received from the user interface and, when the service is in progress, rejects the received request for the service.

5. A non-transitory computer readable storage medium having stored therein a supplementary services control program for controlling supplementary services with a user interface receiving from a user a request for execution of a service, the supplementary service varying according to vendor, the supplementary services control program causing a computer to execute a process comprising:
   setting in a report destination management table (a) a call identifier uniquely identifying a call, (b) service status, and (c) a report destination of a call state transition report being interrelated with each other, the report destination being determined based on the call identifier and the service status, the call state transition report indicating call state transition for every call identifier, the service status indicating a supplementary service, the supplementary service including at least one of call park and call pickup;
   receiving the call state transition report, obtaining the report destination corresponding to a call identifier of the received call state transition report from the report destination management table, and transferring the received call state transition report to the obtained report destination; and
   setting in a module management table a vendor identifier uniquely identifying a vendor, a service identifier of the vendor, and a module identifier uniquely identifying a module that executes the service.

6. The non-transitory computer readable storage medium according to claim 5, the process further comprising:
   setting in a request destination management table a service identifier uniquely identifying a service and a request destination to which execution of the service is requested being interrelated with each other;
   receiving a request for the supplementary service from the user interface, obtaining the request destination corresponding to a service identifier of the supplementary service from the request destination management table, and transferring the request for the supplementary service to the obtained request destination;
   receiving a request for the basic service from the user interface;
   adding an identifier for a call to be generated to the report destination management table when the request is a call generation request; and
   deleting an identifier for a call to be released from the report destination management table when the request is a call release request.

7. The non-transitory computer readable storage medium according to claim 5, the process further comprising updating the report destination management table such that a report destination of a call identifier for a service to be completed is set to the user interface when the received call state transition report is a service completion request report.

8. The non-transitory computer readable storage medium according to claim 6, the process further comprising
   referring to the service status set in the report destination management table when a request for a service is received from the user interface; and
   rejecting the received request for the service when the service is in progress.

9. A method for controlling supplementary services with a user interface receiving from a user a request for execution of a service, the supplementary service varying according to vendor, the method comprising:
   setting in a report destination management table (a) a call identifier uniquely identifying a call, (b) service status, and (c) a report destination of a call state transition report being interrelated with each other, the report destination being determined based on the call identifier and the service status, the call state transition report indicating call state transition for every call identifier, the service status indicating a supplementary service, the supplementary service including at least one of call park and call pickup;
   receiving the call state transition report, obtaining the report destination corresponding to a call identifier of the received call state transition report from the report destination management table, and transferring the received call state transition report to the obtained report destination; and
   setting in a module management table a vendor identifier uniquely identifying a vendor, a service identifier of the vendor, and a module identifier uniquely identifying a module that executes the service.

10. The method according to claim 9, further comprising:
   setting in a request destination management table a service identifier uniquely identifying a service and a request destination to which execution of the service is requested being interrelated with each other;
   receiving a request for the supplementary service from the user interface, obtaining the report destination corresponding to a service identifier of the supplementary service from the request destination management table, and transferring the request for the supplementary service to the obtained request destination;
   receiving a request for the basic service from the user interface;
   adding an identifier for a call to be generated to the report destination management table when the request is a call generation request; and
   deleting an identifier for a call to be released from the report destination management table when the request is a call release request.

11. The method according to claim 9, further comprising updating the report destination management table such that a report destination of a call identifier for a service to be completed is set to the user interface when the received call state transition report is a service completion request report.

12. The method according to claim 10, further comprising
   referring to the service status set in the report destination management table when a request for a service is received from the user interface; and
   rejecting the received request for the service when the service is in progress.

* * * * *